US007259214B2

(12) United States Patent
Bazan et al.

(10) Patent No.: US 7,259,214 B2
(45) Date of Patent: Aug. 21, 2007

(54) METAL CATALYST FOR OLEFIN POLYMERIZATION AND CO-POLYMERIZATION WITH FUNCTIONAL MONOMERS

(75) Inventors: Guillermo C. Bazan, Santa Barbara, CA (US); Prasenjit Ghosh, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/377,491

(22) Filed: Feb. 28, 2003

(65) Prior Publication Data

US 2004/0171479 A1     Sep. 2, 2004

(51) Int. Cl.
*C08F 4/80* (2006.01)
(52) U.S. Cl. .................. 526/115; 526/117; 526/118; 526/119; 526/161; 526/169.1; 526/171; 526/172; 502/150; 502/162; 502/167
(58) Field of Classification Search ........ 526/113–119, 526/161, 172, 169.1, 171
See application file for complete search history.

(56) References Cited

U.S. PATENT DOCUMENTS

| 6,174,976 B1 | 1/2001 | Killian et al. | |
|---|---|---|---|
| 6,897,275 B2 * | 5/2005 | Wang et al. | ........... 526/161 |
| 2004/0024149 A1 | 2/2004 | Bazan | |

FOREIGN PATENT DOCUMENTS

| WO | WO 98/42664 | | 10/1998 |
|---|---|---|---|
| WO | WO98/42664 | * | 10/1998 |
| WO | WO98/42665 | | 10/1998 |
| WO | WO 00/20464 | | 4/2000 |
| WO | WO 01/92348 | * | 12/2001 |
| WO | WO 01/92348 A2 | | 12/2001 |

OTHER PUBLICATIONS

Tomov et al., J. Molecular Catalysis A: Chemical, 103 (1995) 95-103.*
Ittel, S.D. et al., "Late-Metal Catalysts for Ethyleen Homo- and Copolymerization," *Chem. Rev.* 100(4):1169-1203 (2000).
Gates, D.P. et al., "Synthesis of Branched Polyethylene Using (α-Dilmine) nickel(II) Catalysts: Influence of Temperature, Ethylene Pressure, and Ligand Structure on Polymer Properties," *Macromolecules* 33:2320-2334 (2000).
Svejda, S.A. et al., "Low-Temperature Spectroscopic Observation of Chain Growth and Migratory Insertion Barriers in (α-Diimine)Ni(II) Olefin Polymerization Catalysts," *J. am. Chem. Soc.* 121:10634-10635 (1999).
Younkin, T.R. et al., "Neutral, Single-Component Nickel (II) Polyolefin Catalysts That Tolerate Heteroatoms," *SCIENCE* 287:460-462 (2000).
Lee, B.Y. et al., "α-Iminocarboxamidato-Nickel(II) Ethylene Polymerization Catalysts," *J. Am. Chem. Soc.* 123:5352-5353 (2001).

Coates, G.W. et al., "Catalysts for the Living Insertion Polymerization of Alkenes: Access to New Polyolefin Architectures Using Ziegler-Natta Chemistry," *Angew. Chem. Int. Ed.* 41:2236-2257 (2002).
Jansen, J.C. et al., "Evidence of the Quasi-Living Character of the *ansa*-Zirconocene/MAO-Catalyzed Copolymerization of Ethylene and Norbornene," *Macromol. Rapid Commun.* 22(17):1394-1398 (2001).
Schunn, R.A. et al., "BIS(1,5-Cyclooctadiene)Nickel(0)," *Inorg. Synth.* 28:94-98 (1990).
International Search Report, dated Sep. 7, 2004; PCT/US2004/006301.
Written Opinion of the International Searching Authority; PCT/US2004/006301.
"Ethylene Homopolymerization and Copolymerization with Functionalized 5-Norbornen-2-yl Monomers by a Novel Nickel Catalyst System"; By S.J. Diamanti, P. Ghosh, F. Shimizu and G. Bazan; Macromolecules 2003, 36, 9731-9735.
"α-Iminocarboxamidato—Nickel (II) Ethylene Polymerization Catalyst"; By. B.Y. Lee, G.C. Bazan, J. Vela, Z.J. Komon and X. Bu; J. American Chem. Soc. 2001, vol. 123, pp. 5352-5353.
"Boron Trifluoride Activation of Ethylene Oligomerization and Polymerization Catalysts"; By Z.J.A. Komon; G.C. Bazan, C. Fang and X. Bu; Inorganica Chimica Acta, vol. 345, (2003) pp. 95-102.
"Controlled Polymerization of β-Lactamus Using Metal-Amido Complexes: Synthesis of Block Copoly (β-peptides)"; By J. Cheng and T.J. Deming; J. American Chem. Soc. 2001, vol. 123, pp. 9457-9458.
Tomov A et al. "Binuclear Nickel-Ylide Complexes as Effective Ethylene Oligomerization/Polymerization Catalysts" Journal of Molecular Catalysis, Lausanne, Ch, vol. 103, No. 2, 1995, pp. 95-103, XP000853887, table 4.
Soula, R. et al. "Very Active Neutral P,O-Chelated Nickel Catalysts for Ethylene Polymerization" Macromolecules, 34(8), 2438-2442 Coden: Mamobx; ISSN: 0024-9297, 2001, XP199852 See right hand column concerning compound 6, p. 2440.
Kurtev K et al: "Ethene Polymerization by Binuclear Nickel-Ylide Complexes" Journal of Molecular Catalysts, Lausanne, CH, vol. 88, No. 2, 1994, pp. 141-150, XP000853888, table 1.

(Continued)

Primary Examiner—Roberto Rabago
(74) *Attorney, Agent, or Firm*—Berliner & Associates

(57) ABSTRACT

A catalyst is disclosed for the polymerization and co-polymerization of olefins with functionalized monomers. The catalyst is formed from a combination of two neutral metal complexes, L($^i$Pr$_2$)M(CH$_2$Ph)(PMe$_3$)[L=N-(2,6-diisopropylphenyl)-2-(2,6-diisopropylphenylimino)propanamide] and M(COD)$_2$(COD=cyclooctadiene). The catalyst displays a unique mode of action and performs at ambient conditions producing high molecular weight polyolefins and co-polymers with functional groups. The polymerized olefins include ethylene, α-olefins and functionalized olefins.

14 Claims, 14 Drawing Sheets

OTHER PUBLICATIONS

Bun Yeoul Lee et al: "Alpha-Iminocarboxamidato-Nickel (II) Ethylene Polymerization Catalysts" Journal of the American Chemical Society, American Chemical Society, Washington, DC, US, vol. 22, No. 123, 2001, pp. 5352-5353, XP001066396 ISSN: 0002-7863, cited in the application, the whole document.

Diamanti S J, et al: "Ethylene Homoploymerization and Copolymerization with Functionalized 5-Norbornen-2-Yl Monomers by a Novel Nickel Catalyt System" Macromolecules, American Chemical Society, East, US, vol. 36, No. 26, Dec. 30, 2003, pp. 9731-9735, XP001190698 ISSN: 0024-9297, the whole document.

* cited by examiner

METAL CATALYST FOR OLEFIN POLYMERIZATION AND CO-POLYMERIZATION WITH FUNCTIONAL MONOMERS

BACKGROUND OF THE INVENTION

Description of the Related Art

In the last few years several catalysts have been reported for olefin polymerization. The polymerization catalysts reported by Brookhart perform in the presence of methylaluminoxanes and Lewis acids (See reference 1). Several patents have been filed based on these catalysts, (See WO09623010 and references therein). These catalyst systems are thermally unstable and the activity of the methylaluminoxane activated catalysts decays rapidly at 60° C. (See reference 2), and the borane activated catalysts are decomposed at room temperature (See reference 3). Another type of catalyst are those reported by Younkin et al., (See reference 4). These are neutral species that do not require an activator. However, they are prone to an induction period and lower activity compared with the cationic Brookhart systems. PCT application WO01/92348 describes the polymerization of ethylene and the co-polymerization of ethylene using zwitterionic nickel complexes that require the presence of a Lewis acid. Lewis Acids are deactivated by functionalities and they promote unwanted secondary reactions, e.g., chain transfer, which are detrimental to the polymer chain growth. Despite enormous development observed in the area of ethylene polymerization over the last few decades, co-polymerization of ethylene with functional co-monomers has received very little attention.

SUMMARY OF THE INVENTION

The present invention fulfills the need for a method of both ethylene homo-polymerization and co-polymerization of ethylene with functional co-monomers using Group VIII transition metals of the periodic table, instead of the commonly used Group IV metals. The present invention found the late transition metals were more tolerant toward functional groups than the early transition metals.

The present invention provides a catalyst formed from a combination of two neutral metal complexes, e.g., L($^i$Pr$_2$) Ni(CH$_2$Ph)(PMe$_3$)[L=N-(2,6-diisopropylphenyl)-2-(2,6-diisopropylphenylimino)propanamide] and Ni(COD)$_2$ (COD=cyclooctadiene). The catalyst displays a unique mode of action and performs at ambient conditions producing high molecular weight polyolefins and co-polymers with functional groups. The new catalysts provide a convenient route to polyolefin materials with enhanced properties of interest, such as hydrophilicity, thereby significantly increasing the utility of these materials for various commercial purposes.

In one embodiment, the present discloses the synthesis of a nickel catalyst. The catalyst is formed from a combination of two neutral nickel compounds, for the homo-polymerization of olefins such as ethylene, α-olefins and functionalized olefins. The present invention also discloses co-polymerization of olefins with functionalized monomers with functionalities such as alcohols (preferably, 5-norbomen-2-ol) and acetates (preferably, 5-norbornen-2-yl acetate). Additional functionalities include olefins with cyano, keto, alkyl/aryl halides, nitro and sulfanate groups.

The catalyst of the present invention comprises any combination of two neutral metal complexes of the general formulas (I-IV) shown below.

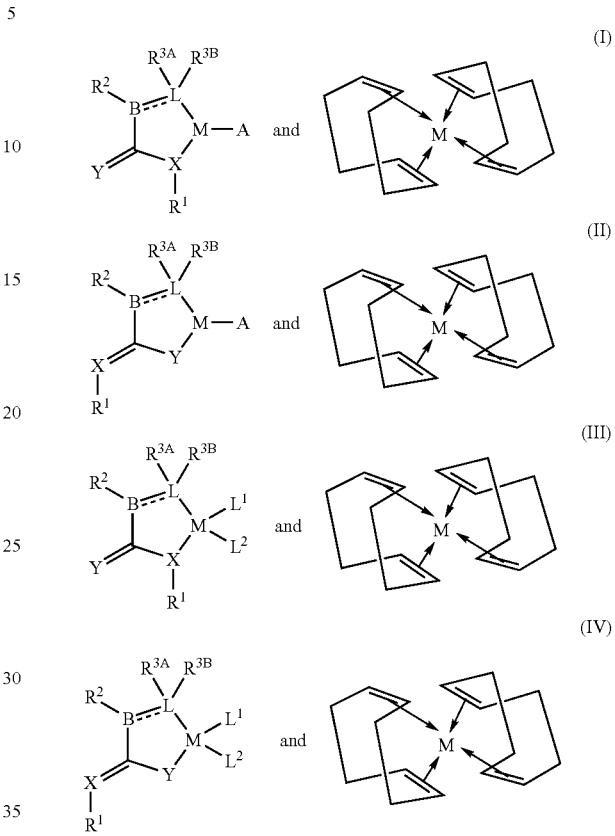

wherein:
M is a Group VIII transition metal such Ni, Pt, or Pd;
A is a π-allyl, substituted π-allyl, π-benzyl, or substituted π-benzyl;
X is N or P;
Y is O, CH$_2$, or S;
L is N or P or a structure that is capable of forming a neutral two electron donor ligand;
L$^1$ is a neutral monodentate ligand which may be displaced by the olefin and L$^2$ is a monoanionic monodentate ligand, or L$^1$ and L$^2$ taken together are a monoanionic bidentate ligand, provided that the monoanionic monodentate ligand or the monoanionic bidentate ligand may add to the olefin;
B is an atom or group of atoms connecting covalently the unsaturated carbon and L;
---- respesent a single or double bond;
R$^1$, R$^2$, R$^{3A}$ and R$^{3B}$ are each independently hydrogen, hydrocarbyl, substituted hydrocarbyl bearing functional group, or other hydrocarbyl group; and
R$^{3B}$ is nothing when B is connected to L by a double bond.
In another embodiment, M is nickel.
In another embodiment, R$^1$ and R$^{3A}$ are (2,6-diisopropylphenyl); R$^2$ is methyl, R$^{3B}$ is nothing; X and L are nitrogen; Y is oxygen; B is carbon; L$^1$ is CH$_2$Ph; ---- is a double bond; and L$^2$ is PMe$_3$.

In another embodiment, the present invention discloses a process for the polymerization and co-polymerization of an olefin wherein the olefin is selected from one or more of $R^4CH=CH_2$, cyclopentene, a styrene, a norbornene, or polar olefins such as $H_2C=CR^5(CH_2)_sCO_2R^6$, substituted cyclopentene, styrene, norbornene derivatives bearing functional groups or other hydrocarbyl groups, in the presence of a catalyst derived from a combination of two neutral nickel complexes, at a temperature of about −100° C. to about 200° C. $R^4$, $R^5$ and $R^6$ are each independently hydrogen, hydrocarbyl group, substituted hydrocarbyl bearing functional groups, or other hydrocarbyl groups and s is an integer from 0 to 100.

In a further embodiment, the present invention discloses novel polyolefinic products obtained by the co-polymerizations of ethylene with 5-norbornen-2-yl acetate and of ethylene with 5-norbornen-2-yl alcohol.

DETAILED DESCRIPTION OF THE INVENTION

Figure 13:
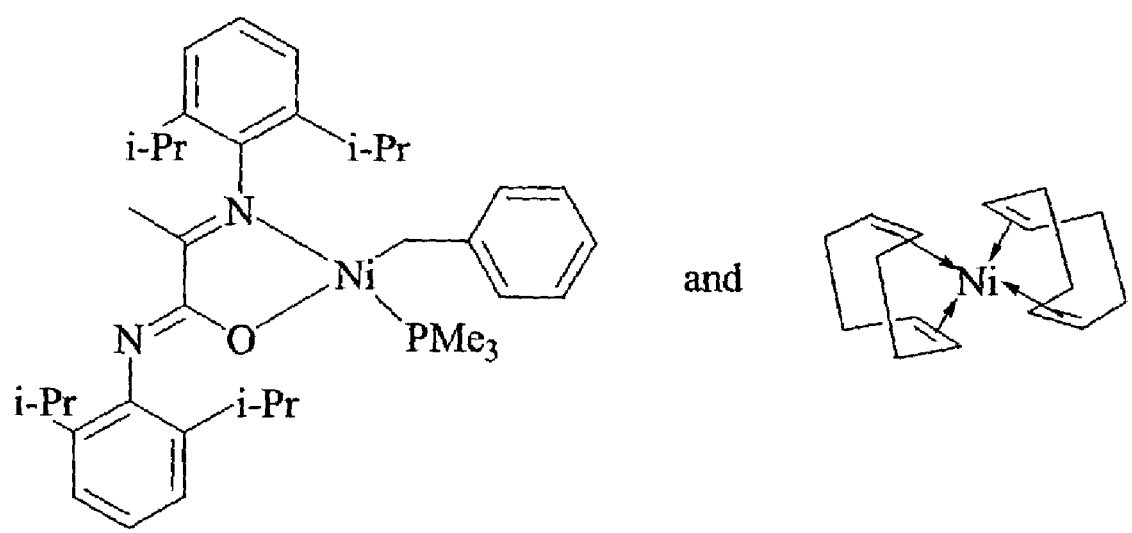
FIG. 13 is a schematic representation of the catalyst.

All examples were performed under an inert atmosphere using standard glove box and Schlenk techniques. Solvents for syntheses like toluene, THF, hexane and pentane were distilled from benzophenone ketyl as required. All polymerization reactions were carried out in a glass reactor as described previously (See reference 5). Toluene for polymerization runs was distilled from sodium/potassium alloy. FIG. 13 shows a schematic of the catalyst L($^i$Pr$_2$)Ni(CH$_2$Ph)(PMe$_3$)[L=N-(2,6-diisopropylphenyl)-2-(2,6-diisopropylphenylimino)propanamide] (See reference 5) and Ni(COD)$_2$ (See reference 6) were synthesized as reported and purified by re-crystallization prior to polymerization use. NMR spectra were obtained using a Varian Unity 400 or 500 spectrometers. $^1$H NMR and the $^{13}$C NMR spectra of the polymers were obtained in mixed solvent (C$_6$D$_6$/1,2,4-trichlorobenzene 1:4 ratio in volume) at about 115° C. and (C$_6$D$_6$/o-dichlorobenzene about 7% v/v for polyethylene polymer and about 9% v/v for the copolymers) at about 120° C. GPC analyses were done at Mitsubishi Chemical Corporation., Japan, in o-dichlorobenzene in about 135° C.

EXAMPLE 1

A glass reactor was loaded inside a glove box with L($^i$Pr$_2$)Ni($\eta^1$-CH$_2$Ph)(PMe$_3$) (about 10 μmol; 1.00 g of 8.77 mM solution in toluene) and Ni(COD)$_2$ (about 10 μmol; 0.500 g of 17.3 mM solution in toluene) and toluene (about 24.45 g) such that the final volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 20 minutes and acetone was added to quench the polymerization. The precipitated polymer was collected by filtration and dried under high vacuum overnight. The reaction produced about 0.509 g of polyethylene polymer. The activity of the catalyst was about 280 kg mol$^{-1}$ h$^{-1}$.

Figure 1:
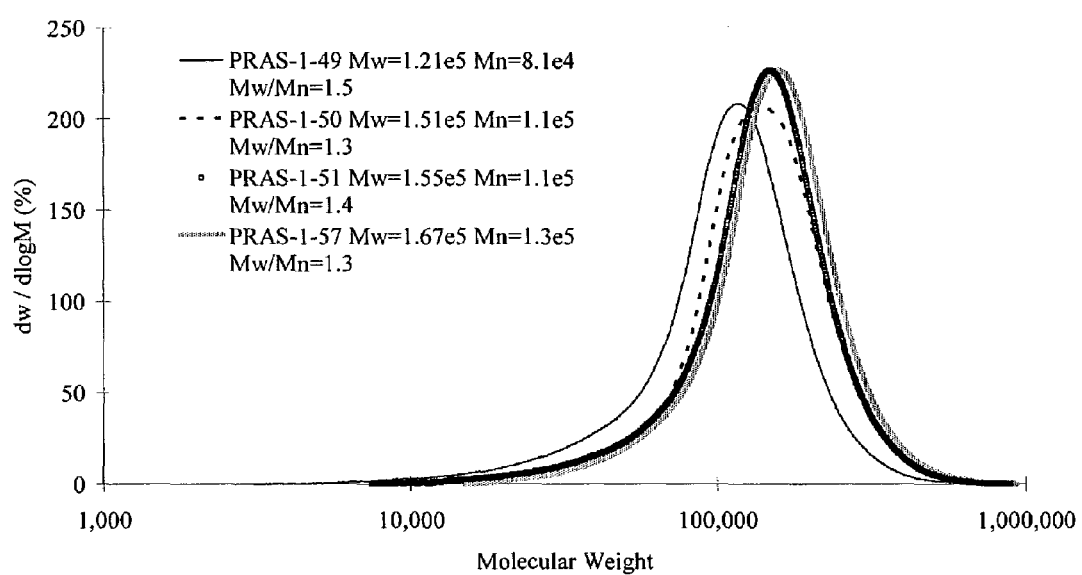
FIG. 1 is a graphical representation of an embodiment of the present invention showing the molecular weight distributions of polyethylene polymers of Examples 1, 2, 3, and 5.

Polymer Characterization: GPC Analysis (o-dichlorobenzene, about 135° C.): M$_w$=about 1.21×10$^5$, M$_w$/M$_n$=about 1.5. DSC Analysis: T$_m$=about 126.0° C. $^1$H NMR (C$_6$D$_6$/1, 2,4-trichlorobenzene, about 115° C.): 11.9 methyl branches per 1000 methylene carbons. A molecular weight distribution trace of polyethylene polymers is shown in FIG. 1. A unimodal distribution was observed for all polymers examined.

EXAMPLE 2

A glass reactor was loaded inside a glove box with L($^i$Pr$_2$)Ni($\eta^1$-CH$_2$Ph)(PMe$_3$) (about 10 μmol; 1 g of 8.77 mM solution in toluene), Ni(COD)$_2$ (about 25 μmol; 1.25 g of 17.3 mM solution in toluene) and toluene (about 23.7 g), such that the final volume of the toluene solution was about 30 mL. The glass reactor was sealed inside the glove box and taken out. Ethylene was fed continuously into the reactor at about 100 psi and the pressurized reaction mixture was stirred at about 20° C. Ethylene was vented after about 20 minutes and acetone was added to quench the polymerization. The precipitated polymer was collected by filtration and dried under high vacuum overnight. About 1.213 g of polyethylene polymer was obtained. The activity of the catalyst was about 446 kg mol$^{-1}$ h$^{-1}$.

Polymer Characterization: GPC Analysis (o-dichlorobenzene, about 135° C.): $M_w$=about 1.51×10$^5$, $M_w/M_n$=about 1.3. DSC Analysis: $T_m$=about 125.3° C. $^1$H NMR ($C_6D_6$/1, 2,4-trichlorobenzene, about 115° C.): 18.5 methyl branches per 1000 methylene carbons. The molecular weight distribution of the polyethylene obtained is shown in FIG. 1.

EXAMPLE 3

A glass reactor was loaded inside a glove box with L($^i$Pr$_2$)Ni($\eta^l$-CH$_2$Ph)(PMe$_3$) (about 10 μmol; 1 g of 8.77 mM solution in toluene) and Ni(COD)$_2$ (about 50 μmol; 2.5 g of 17.3 mM solution in toluene) and toluene (about 22.45 g) such that the total volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 20 minutes and acetone was added to quench the polymerization. The precipitated polymer was collected by filtration and dried under high vacuum overnight. The reaction produced about 1.255 g of polyethylene polymer. The activity of the catalyst was about 454 kg mol$^{-1}$ h$^{-1}$.

Polymer Characterization: GPC Analysis (o-dichlorobenzene, about 135° C.): $M_w$=about 1.55×10$^5$, $M_w/M_n$=about 1.4. DSC Analysis: $T_m$=about 125.4° C. $^1$H NMR ($C_6D_6$/1, 2,4-trichlorobenzene, about 115° C.): 17.4 methyl branches per 1000 methylene carbons. The molecular weight distribution of the polyethylene polymer is shown in FIG. 1.

EXAMPLE 4

A glass reactor was loaded inside a glove box with Ni(COD)$_2$ (about 10 μmol; 0.5 g of 17.3 mM solution in toluene) and toluene (about 25.45 g) such that the total volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. No consumption of ethylene was observed.

EXAMPLE 5

A glass reactor was loaded inside a glove box with L($^i$Pr$_2$)Ni($\eta^l$-CH$_2$Ph)(PMe$_3$) (about 10 μmol; 1 g of 8.77 mM solution in toluene) and Ni(COD)$_2$ (about 100 μmol; 5 g of 17.3 mM solution in toluene) and toluene (about 19.95 g) such that the total volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 20 minutes and acetone was added to quench the polymerization. The precipitated polymer was collected by filtration and dried under high vacuum overnight. The reaction produced about 1.317 g of polyethylene polymer. The activity of the catalyst was about 484 kg mol$^{-1}$ h$^{-1}$.

Polymer Characterization: GPC Analysis (o-dichlorobenzene, about 135° C.): Mw=about 1.67×10$^5$, $M_w/M_n$=about 1.3. DSC Analysis: $T_m$=about 125.2° C. $^1$H NMR ($C_6D_6$/1, 2,4-trichlorobenzene, about 115° C.): 19.3 methyl branching branches per 1000 methylene carbons. The molecular weight distribution of the polyethylene polymer is shown in FIG. 1.

EXAMPLE 6

A glass reactor was loaded inside a glove box with L($^i$Pr$_2$)Ni($\eta^l$-CH$_2$Ph)(PMe$_3$) (about 10 μmol; 1 g of 8.77 mM solution in toluene) and toluene (about 24.95 g), such that the total volume of the toluene solution was about 30 mL. The glass reactor was sealed inside the glove box and taken out. Ethylene was fed continuously into the reactor at about 100 psi and the pressurized reaction mixture was stirred at about 20° C. No polymerization was observed.

EXAMPLE 7

Figure 9:
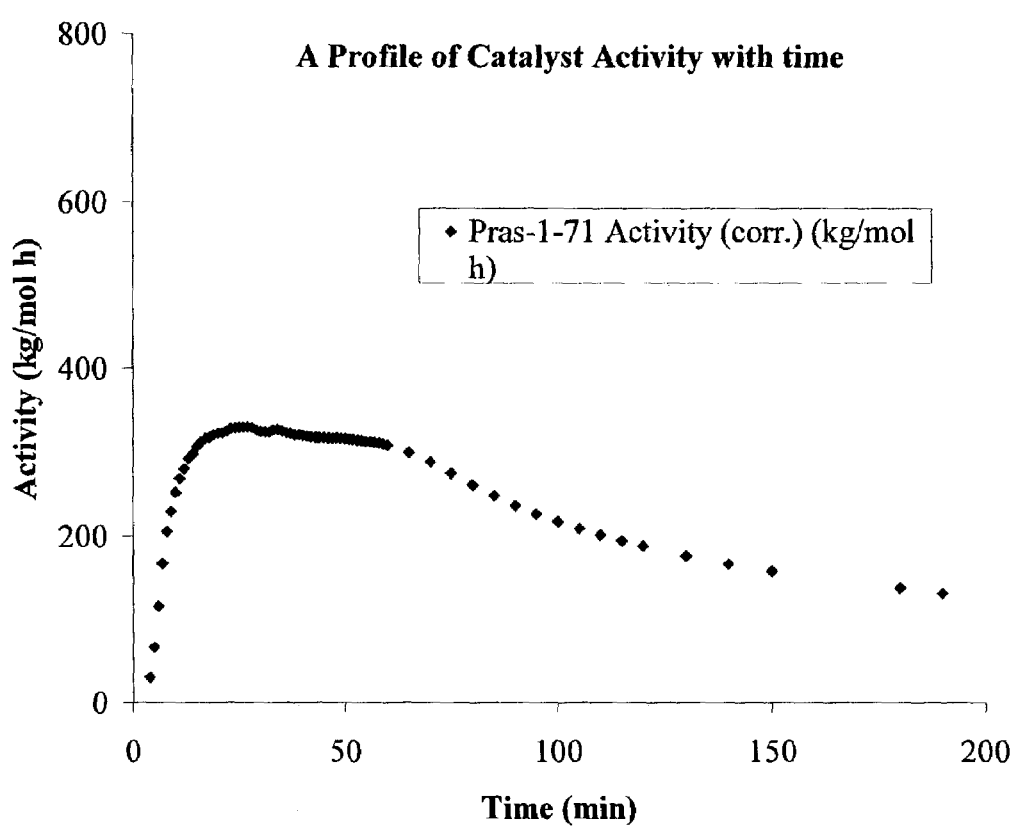
FIG. 9 is a graph showing the profile of the catalyst activity over time of Example 7.

In order to ascertain the lifetime of the catalyst, an ethylene polymerization run was carried out with prolonged reaction time. The catalyst was found to active even after about 3 hours. A profile of the activity of the catalyst with time is shown in FIG. 9. A glass reactor was loaded inside a glove box with L($^i$Pr$_2$)Ni($\eta^l$-CH$_2$Ph)(PMe$_3$) (about 10 μmol; 1 g of 8.77 mM solution in toluene) and Ni(COD)$_2$ (about 25 μmol; 1.25 g of 17.6 mM solution in toluene) and toluene (about 23.7 g), such that the total volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 190 minutes and acetone was added to quench the polymerization. The precipitated polymer was collected by filtration and dried under high vacuum overnight. The reaction produced about 4.463 g of polyethylene polymer. The activity of the catalyst was about 139 kg mol$^{-1}$ h$^{-1}$.

Figure 2:
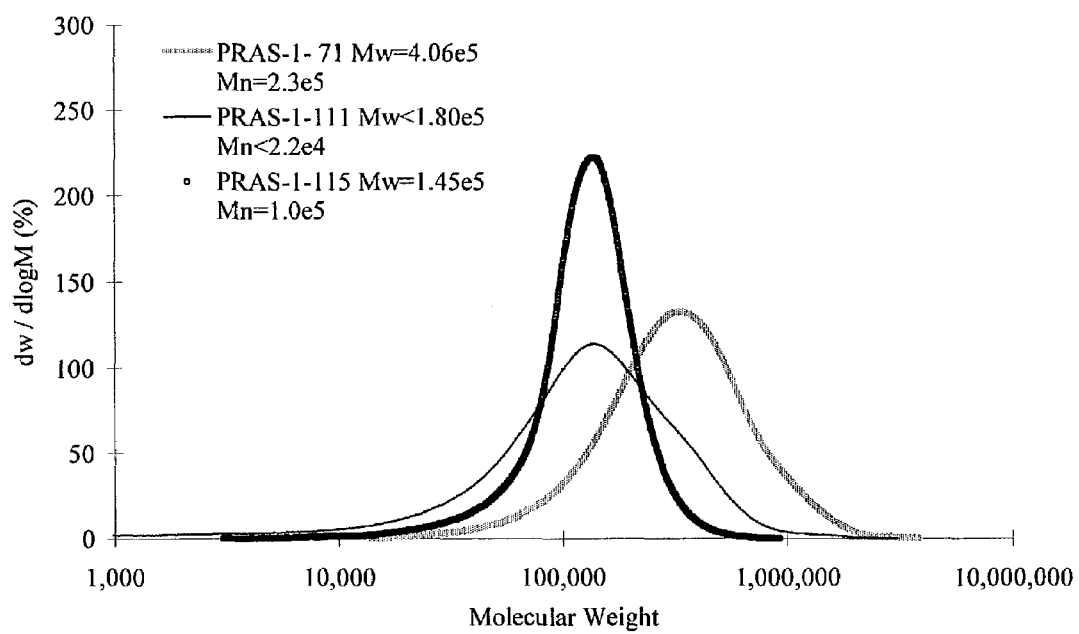
FIG. 2 is a graphical representation of an embodiment of the present invention showing the molecular weight distributions of polyethylene polymers of Examples 7, 8, and 9A.

Polymer Characterization: The molecular weight of the polyethylene polymer was verified by two different methods and the results are in close agreement with each other. Refractive Index GPC Analysis (o-dichlorobenzene, about 135° C.): $M_w$=about 4.06×10$^5$, $M_w/M_n$=about 1.8. IR GPC Analysis (o-dichlorobenzene, about 135° C.): $M_w$=about 3.87×10$^5$, $M_w/M_n$=about 2.1. DSC Analysis: $T_m$=about 124.1° C. $^{13}$C NMR ($C_6D_6$/o-dichlorobenzene): 9.5 methyl branches per 1000 methylene carbons; 0.8 ethyl branches per 1000 methylene carbons; 0.2 butyl branches per 1000 methylene carbons and 0.4 hexyl (and longer) branches per 1000 methylene carbons. The molecular weight distribution of the polyethylene is shown in FIG. 2. A narrow unimodal distribution was observed in all cases.

EXAMPLE 8

A glass reactor was loaded inside a glove box with L($^i$Pr$_2$)Ni($\eta^l$-CH$_2$Ph)(PMe$_3$) (about 20 μmol; 2 g of 8.77 mM solution in toluene) and Ni(COD)$_2$ (about 50 μmol; 2.5 g of 17.6 mM solution in toluene) and toluene (about 21.45 g) such that the total volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 20 minutes and acetone was added to quench the polymerization. The precipitated polymer was collected by filtration and dried under high vacuum overnight. The reaction produced about 3.608 g of polyethylene polymer. The activity of the catalyst was about 457 kg mol$^{-1}$ h$^{-1}$.

Polymer Characterization: The molecular weight of the polyethylene polymer was verified by two different methods and the results are in close agreement with each other.

Refractive Index GPC Analysis (o-dichlorobenzene, about 135° C.): $M_w$=<1.8×10$^5$. IR GPC Analysis (o-dichlorobenzene, about 135° C.): $M_w$=about 1.77×10$^5$, $M_w/M_n$=about 2.4. DSC Analysis: $T_m$=about 119.6° C. $^1$H NMR ($C_6D_6$/1,2,4-trichlorobenzene, about 115° C.): 66.4 methyl branching branches per 1000 methylene carbons. The molecular weight distribution of the polyethylene polymer is shown in FIG. 2.

EXAMPLE 9

An experiment was performed to study the polymerization efficiency of the active species formed from the catalyst precursors, L($^i$Pr$_2$)Ni($\eta^1$-CH$_2$Ph)(PMe$_3$) and Ni(COD)$_2$, as a function of time. Specifically in this experiment, the active species was formed by combining the solutions of L($^i$Pr$_2$)Ni(CH$_2$Ph)(PMe$_3$) and Ni(COD)$_2$. Half of the solution was used for ethylene polymerization instantly while the other half was stored in the dark at about room temperature and was used for ethylene polymerization after about 5 hours.

A. At zero mixing time: A glass reactor was loaded inside a glove box with L($^i$Pr$_2$)Ni($\eta^1$-CH$_2$Ph)(PMe$_3$) (about 10 μmol; 1 g of 8.77 mM solution in toluene) and Ni(COD)$_2$ (about 25 μmol; 1.25 g of 17.6 mM solution in toluene) and toluene (about 23.7 g) such that the total volume of the toluene solution was about 30 mL. The glass reactor was sealed inside the glove box and taken out. Ethylene was fed continuously into the reactor at about 100 psi and the pressurized reaction mixture was stirred at about 20° C. Ethylene was vented after about 20 minutes and acetone was added to quench the polymerization. The precipitated polymer was collected by filtration and dried under high vacuum overnight. About 1.234 g of polyethylene polymer was obtained. The activity of the catalyst was about 454 kg mol$^{-1}$ h$^{-1}$.

Figure 14:
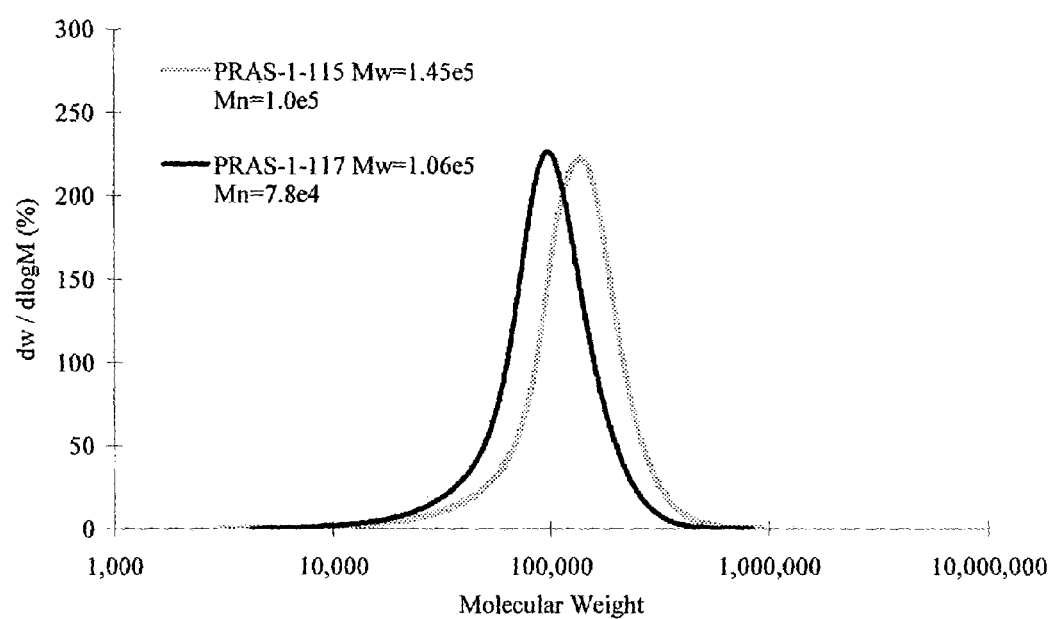
FIG. 14 is a graph showing the GPC traces for the polyethylene polymers produced by the catalyst let to age over time of Example 9.

Polymer Characterization: GPC Analysis (o-dichlorobenzene, about 135° C.): $M_w$=about 1.43×10$^5$, $M_w/M_n$=about 1.4. DSC Analysis: $T_m$=about 126.2° C. $^1$H NMR ($C_6D_6$/1,2,4-trichlorobenzene, about 115° C.): 16.0 methyl branching branches per 1000 methylene carbons. The molecular weight distribution of the polyethylene polymer is shown in FIGS. 2 and 14.

B. At about 5 hours mixing time: A glass reactor was loaded inside a glove box with L($^i$Pr$_2$)Ni($\eta^1$-CH$_2$Ph)(PMe$_3$) (about 10 μmol; 1 g of 8.77 mM solution in toluene) and Ni(COD)$_2$ (about 25 μmol; 1.25 g of 17.6 mM solution in toluene) and rest toluene (about 23.7 g) such that the total volume of the toluene solution was about 30 mL. The glass reactor was sealed inside the glove box and taken out. Ethylene was fed continuously into the reactor at about 100 psi and the pressurized reaction mixture was stirred at about 20° C. Ethylene was vented after about 20 minutes and acetone was added to quench the polymerization. The precipitated polymer was collected by filtration and dried under high vacuum overnight. About 0.663 g of polyethylene polymer was obtained. The activity of the catalyst was about 302 kg mol$^{-1}$ h$^{-1}$.

Polymer Characterization: GPC Analysis (o-dichlorobenzene, about 135° C.): $M_w$=about 1.06×10$^5$, $M_w/M_n$=about 1.4. DSC Analysis: $T_m$=about 128.7° C. $^1$H NMR ($C_6D_6$/1,2,4-trichlorobenzene, about 115° C.): 5.2 methyl branching branches per 1000 methylene carbons. The molecular weight distribution of the polyethylene polymer is shown in FIG. 14.

The activity of the catalyst (about 454 kg mol$^{-1}$ h$^{-1}$) of the initial run was significantly higher than the run recorded after about 5 hours (about 302 kg mol$^{-1}$ h$^{-1}$). Similarly, the molecular weight of the polyethylene produced in case of the initial run ($M_w$=about 1.43×10$^5$; $M_w/M_n$=about 1.4) was considerably higher than that of the run obtained after about 5 hours ($M_w$=about 1.06×10$^5$; $M_w/M_n$=about 1.4) (FIG. 14).

EXAMPLE 10

Figure 11:
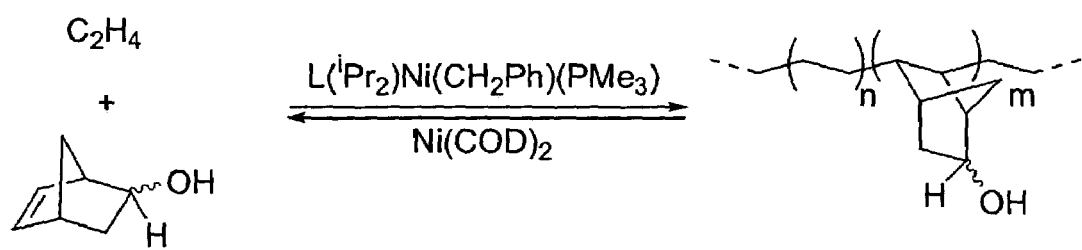
FIG. 11 is a schematic of the synthesis of a high molecular weight ester-functionalized polyethyelene polymer, using 5-norbornen-2-ol as a co-monomer.

A glass reactor was loaded inside a glove box with L($^i$Pr$_2$)Ni($\eta^1$-CH$_2$Ph)(PMe$_3$) (about 20 μmol; 2.00 g of 8.77 mM solution in toluene), Ni(COD)$_2$ (about 50 μmol; 2.5 g of 17.6 mM solution in toluene), 5-norbornen-2-ol (about 4.49 mmol; 3.00 g of 1.30 M solution in toluene) and toluene (about 18.45 g) such that the total volume of the toluene solution was about 30 mL. FIG. 11 shows this synthesis. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 20 minutes and acetone was added to quench the polymerization. The precipitated polymer was collected by filtration and dried under high vacuum overnight. The reaction produced about 0.518 g of ethylene/5-norbornen-2-ol co-polymer. The activity of the catalyst with respect to ethylene consumption was about 105 kg mol$^{-1}$ h$^{-1}$.

Polymer Characterization: The molecular weight of the polyethylene polymer was verified by two different methods and the results are in close agreement with each other. Refractive Index GPC Analysis (o-dichlorobenzene, about 135° C.): $M_w$=about 3.75×10$^4$, $M_w/M_n$=about 1.3. IR GPC Analysis (o-dichlorobenzene, about 135° C.): $M_w$=about 2.56×10$^4$, $M_w/M_n$=about 2.0. DSC Analysis: $T_m$=about 72.9° C. (broad peak). $^{13}$C NMR ($C_6D_6$/o-dichlorobenzene, about 120° C.): 2.9 methyl branches per 1000 methylene carbons. About 15.8% incorporation of norbornenyl group.

Figure 3:
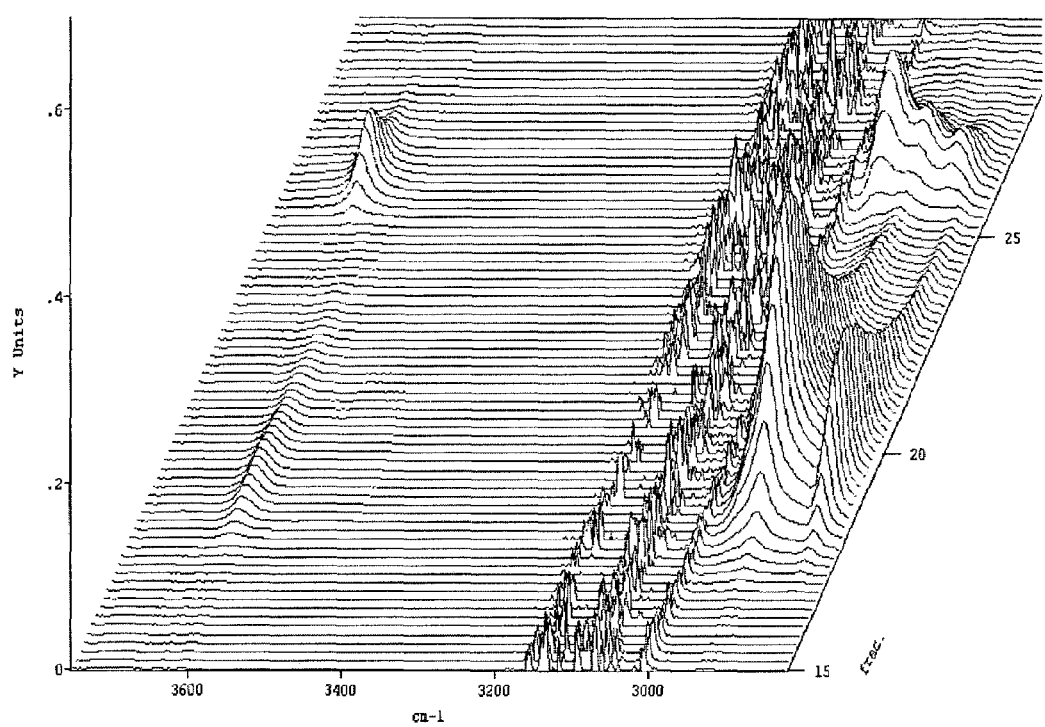
FIG. 3 is a three-dimensional Gel Permeation Chromatography Furrier transform (GPC-FTIR) chromatogram of ethylene/5-norbornen-2-ol co-polymer of Example 10.

A three-dimensional GPC-FTIR chromatogram of ethylene/5-norbornen-2-ol co-polymer showing the presence of hydroxyl functionality with the —(CH$_2$)$_n$— group of the polymer backbone is shown in FIG. 3. GPC is used as an analytical procedure for separating molecules by their difference in size and to obtain molecular weight averages (Mw, Mn) or information on the molecular weight distribution of polymers. The technique is well known and described, for instance, see Reference 7.

Figure 4:
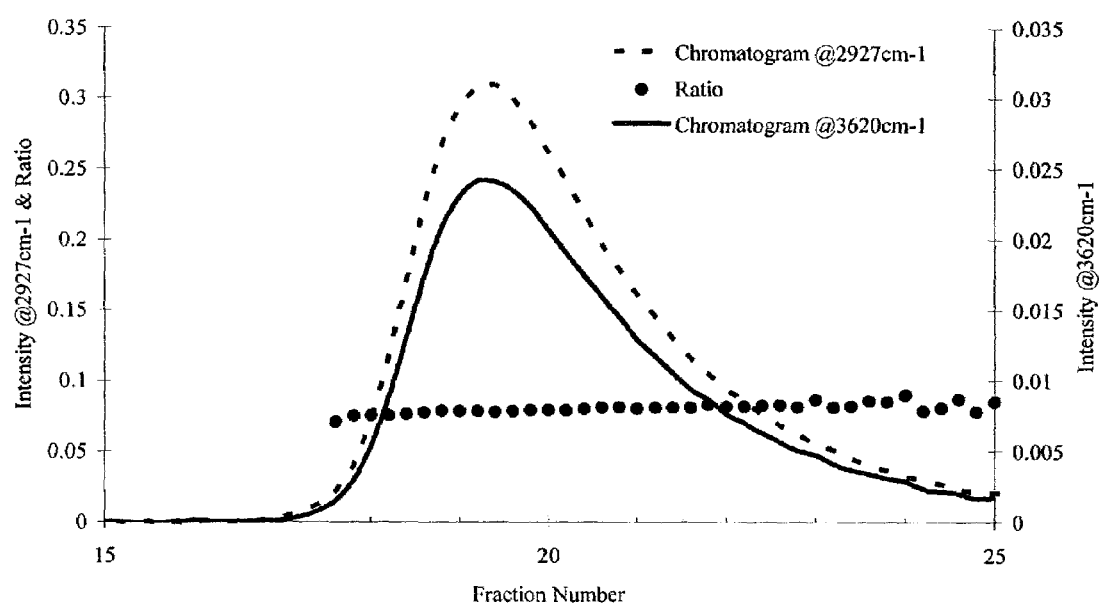
FIG. 4 is a GPC-IR chromatogram showing a constant molecular composition versus molecular weight by monitoring of the hydroxyl O—H stretching peak (3620 cm$^{-1}$) to that of the C—H stretching peak (2927 cm$^{-1}$) of Example 10.
Figure 5:
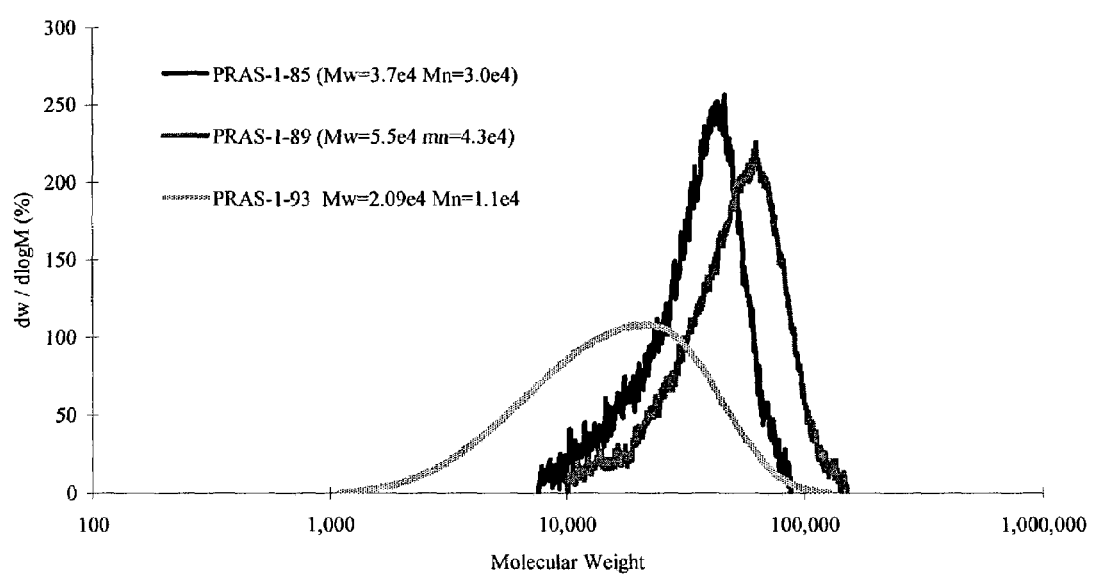
FIG. 5 is a graphical representation of an embodiment of the present invention showing the molecular weight distributions of ethylene/5-norbornen-2-ol co-polymers of Examples 10, 11, and 12.

The composition of the ethylene/5-norbornen-2-ol co-polymer was found to be uniform throughout the polymer chain as seen from a constant ratio observed for the hydroxyl O—H stretching peak (3620 cm$^{-1}$) to that of the C—H stretching peak (2927 cm$^{-1}$) versus time, as shown in FIG. 4. A molecular weight distribution trace of ethylene/5-norbornen-2-ol co-polymers is shown in FIG. 5. A narrow, monomodal, distribution was observed in all cases.

EXAMPLE 11

A glass reactor was loaded inside a glove box with L($^i$Pr$_2$)Ni($\eta^1$-CH$_2$Ph)(PMe$_3$) (about 20 μmol; 2.00 g of 8.77 mM solution in toluene), Ni(COD)$_2$ (about 50 μmol; 2.50 g of 17.6 mM solution in toluene), 5-norbornen-2-ol (about 4.49 mmol; 3.00 g of 1.30 M solution in toluene) and toluene (about 18.45 g) such that the total volume of the toluene solution was 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 20 minutes and acetone was added to quench the polymerization. The precipitated polymer was collected by filtration and dried under high vacuum overnight. The reaction provided about 0.508 g of ethylene/5-norbornen-2-ol co-polymer. The activity of the catalyst with respect to ethylene consumption was about 124 kg mol$^{-1}$ h$^{-1}$.

Polymer Characterization: The molecular weight of the polyethylene polymer was verified by two different methods and the results are in close agreement with each other. Refractive Index GPC Analysis (o-dichlorobenzene, about 135° C.): $M_w$=about 5.47×10$^4$, $M_w/M_n$=about 1.3. IR GPC Analysis (o-dichlorobenzene, about 135° C.): $M_w$=about 3.01×10$^4$, $M_w/M_n$=about 1.9. DSC Analysis: $T_m$=about 67.9° C. (broad peak). $^{13}$C NMR (C$_6$D$_6$/o-dichlorobenzene, about 120° C.): 3.8 methyl branches per 1000 methylene carbons. About 15.9% incorporation of norbornenyl group. The endo/exo ratio was about 69:25. The molecular weight distribution of the ethylene/5-norbornen-2-ol co-polymer is shown in FIG. 5.

EXAMPLE 12

A glass reactor was loaded inside a glove box with L($^i$Pr$_2$)Ni(η$^l$-CH$_2$Ph)(PMe$_3$) (about 20 μmol; 2.00 g of 8.77 mM solution in toluene), Ni(COD)$_2$ (about 50 μmol; 2.50 g of 17.6 mM solution in toluene), 5-norbornen-2-ol (about 0.91 mmol; 3.00 g of 0.26 M solution in toluene) and toluene (about 18.45 g) such that the total volume of the toluene solution was about 30 mL. The glass reactor was sealed inside the glove box and taken out. Ethylene was fed continuously into the reactor at about 100 psi and the pressurized reaction mixture was stirred at about 20° C. Ethylene was vented after about 20 minutes and acetone was added to quench the polymerization. The precipitated polymer was collected by filtration and dried under high vacuum overnight. About 0.102 g of ethylene/5-norbornen-2-ol co-polymer was obtained. The activity of the catalyst with respect to ethylene consumption was about 88 kg mol$^{-1}$ h$^{-1}$.

Polymer Characterization: The molecular weight of the polyethylene polymer was verified by two different methods and the results are in close agreement with each other. Refractive Index GPC Analysis (o-dichlorobenzene, about 135° C.): $M_w$=about 2.09×10$^4$, $M_w/M_n$=about 1.9. IR GPC Analysis (o-dichlorobenzene, about 135° C.): $M_w$=about 1.90×10$^4$, $M_w/M_n$=about 1.9. DSC Analysis: $T_m$=about 87.9° C. (broad peak). $^1$H NMR (C$_6$D$_6$/1,2,4-trichlorobenzene, about 115° C.): 35.3 methyl branches per 1000 methylene carbons. About 4.7% incorporation of norbornenyl group.

Figure 6:
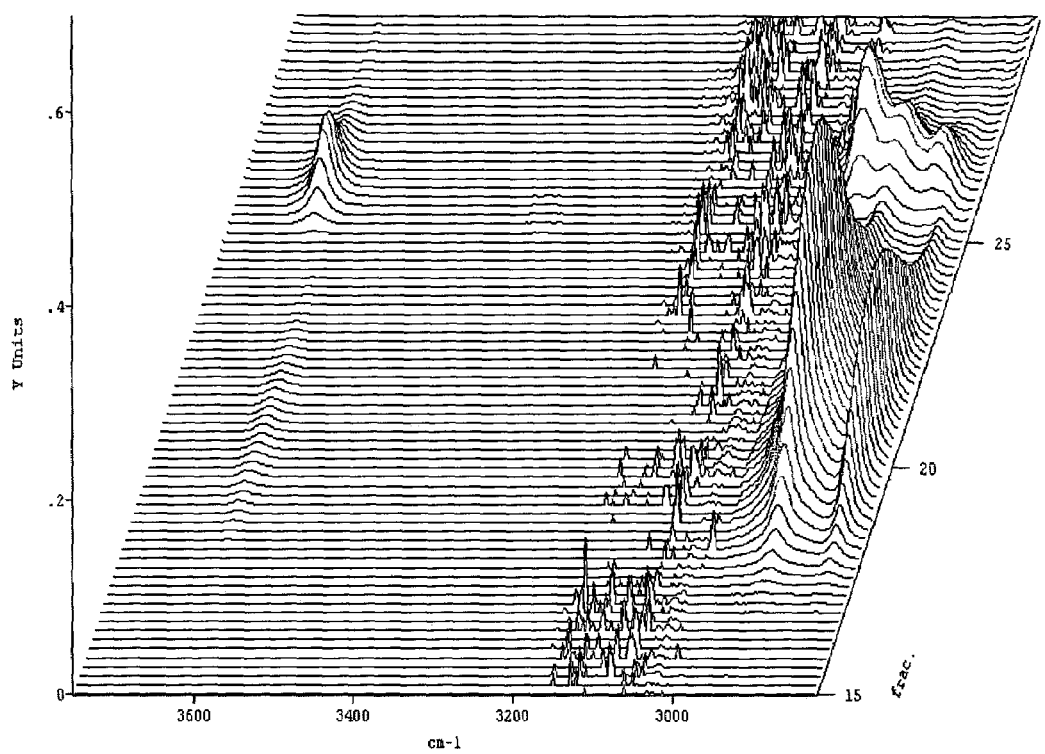
FIG. 6 is a three-dimensional GPC-FTIR chromatogram of ethylene/5-norbornen-2-ol co-polymer of Example 12.
Figure 7:
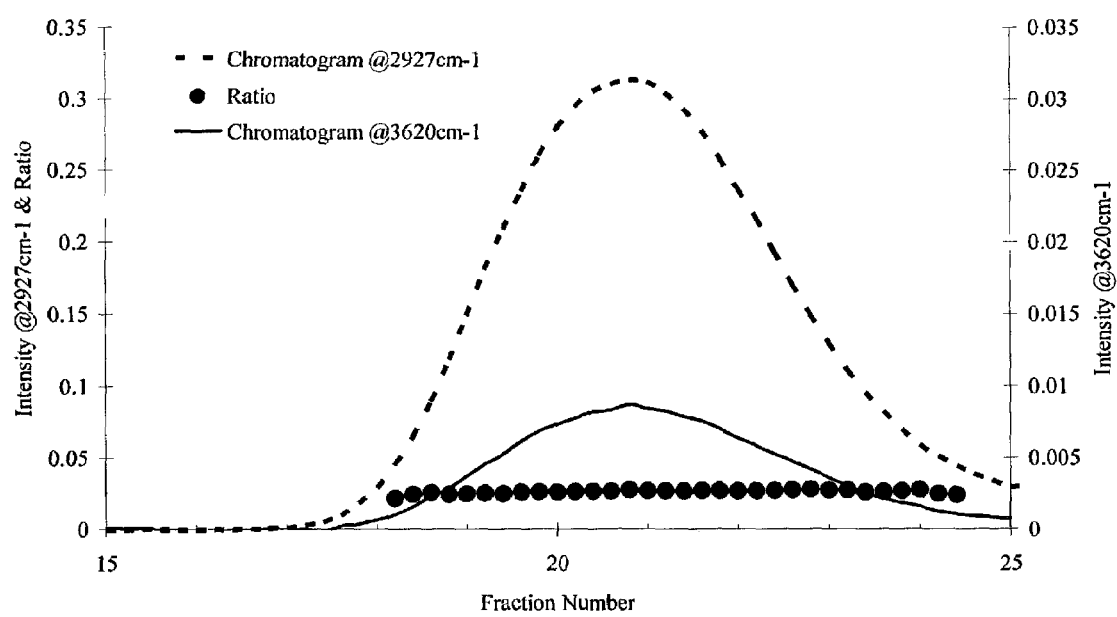
FIG. 7 is a GPC-IR chromatogram showing a constant ratio with time of—hydroxyl O—H stretching peak (3620 cm$^{-1}$) to that of the C—H stretching peak (2927 cm$^{-1}$) of Example 12.

A three-dimensional Fourier transform GPC-IR chromatogram showing a constant ratio of the hydroxyl functionality versus the —(CH$_2$)$_n$— group of the polymer backbone is shown in FIG. 6. The composition of the ethylene/5-norbornen-2-ol co-polymer was found to be uniform throughout the polymer chain, as seen from the constant ratio of the hydroxyl O—H stretching peak (3620 cm$^{-1}$) relative that of the C—H stretching peak (2927 cm$^{-1}$) versus time, as seen in FIG. 7. The molecular weight distribution of the ethylene/5-norbornen-2-ol co-polymer is shown in FIG. 5.

EXAMPLE 13

A glass reactor was loaded inside a glove box with L($^i$Pr$_2$)Ni(η$^l$-CH$_2$Ph)(PMe$_3$) (about 20 μmol; 2.00 g of 8.77 mM solution in toluene), Ni(COD)$_2$ (about 50 μmol; 2.50 g of 17.6 mM solution in toluene), 5-norbornen-2-ol (about 9.12 mmol; 3.00 g of 2.63 M solution in toluene) and toluene (about 18.45 g) such that the total volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 20 minutes and acetone was added to quench the polymerization. The precipitated polymer was collected by filtration and dried under high vacuum overnight. About 0.498 g of ethylene/5-norbornen-2-ol co-polymer was obtained. The activity of the catalyst with respect to ethylene consumption was about 86 kg mol$^{-1}$ h$^{-1}$.

Polymer Characterization: IR GPC Analysis (o-dichlorobenzene, about 135° C.): $M_w$=about 1.38×10$^4$, $M_w/M_n$=about 2.9. DSC Analysis: $T_m$=about 87.8° C. (broad peak). $^1$H NMR (C$_6$D$_6$/1,2,3-trichlorobenzene, about 115° C.): 55.3 methyl branches per 1000 methylene carbons. About 18.5% incorporation of norbornenyl group.

EXAMPLE 14

A glass reactor was loaded inside a glove box with L($^i$Pr$_2$)Ni(η$^l$-CH$_2$Ph)(PMe$_3$) (about 20 μmol; 2.00 g of 8.77 mM solution in toluene), Ni(COD)$_2$ (about 50 μmol; 2.50 g of 17.6 mM solution in toluene), 5-norbornen-2-ol (about 4.49 mmol; 3.00 g of 1.30 M solution in toluene) and toluene (about 18.45 g) such that the total volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 120 minutes and acetone was added to quench the polymerization. The precipitated polymer was collected by filtration and dried under high vacuum overnight. The reaction produced about 0.831 g of ethylene/5-norbornen-2-ol co-polymer. The activity of the catalyst with respect to ethylene consumption was about 20 kg mol$^{-1}$ h$^{-1}$.

Polymer Characterization: RI GPC Analysis (o-dichlorobenzene, about 135° C.): $M_w$=about 6.89×10$^4$, $M_w/M_n$=about 3.1. DSC Analysis: $T_m$=broad glass transition. $^1$H NMR (C$_6$D$_6$/1,2,4-trichlorobenzene, about 115° C.): 18.8 methyl branches per 1000 methylene carbons. About 18.5% incorporation of norbornenyl group.

EXAMPLE 15

A glass reactor was loaded inside a glove box with L($^i$Pr$_2$)Ni(η$^l$-CH$_2$Ph)(PMe$_3$) (about 20 μmol; 2.00 g of 8.77 mM solution in toluene), Ni(COD)$_2$ (about 50 μmol; 2.50 g of 17.6 mM solution in toluene), 5-norbornen-2-ol (about 1.99 mmol; 3.00 g of 0.578 M solution in toluene) and toluene (about 18.45 g) such that the total volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 20 minutes and acetone was added to quench the polymerization. The precipitated polymer was collected by filtration and dried under high vacuum overnight. The reaction produced about 1.14 g of ethylene/5-norbornen-2-ol co-polymer. The activity of the catalyst with respect to ethylene consumption was about 156 kg mol$^{-1}$ h$^{-1}$.

Polymer Characterization: RI GPC Analysis (o-dichlorobenzene, about 135° C.): $M_w$=about 8.68×10$^4$, $M_w/M_n$=about 3.9. DSC Analysis: $T_m$=about 100.5° C.

(broad peak). $^1$H NMR (C$_6$D$_6$/1,2,4-trichlorobenzene, about 115° C.): 20.4 methyl branches per 1000 methylene carbons. About 13.5% incorporation of norbornenyl group.

EXAMPLE 16

A glass reactor was loaded inside a glove box with L($^i$Pr$_2$)Ni($\eta^1$-CH$_2$Ph)(PMe$_3$) (about 20 μmol; 2.00 g of 8.77 mM solution in toluene), Ni(COD)$_2$ (about 50 μmol; 2.50 g of 17.6 mM solution in toluene), 5-Norbornen-2-ol (about 3.99 mmol; 3.00 g of 1.15 M solution in toluene) and toluene (about 18.45 g) such that the total volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 20 minutes and acetone was added to quench the polymerization. The precipitated polymer was collected by filtration and dried under high vacuum overnight. The reaction produced about 0.619 g of ethylene/5-norbornen-2-ol co-polymer. The activity of the catalyst with respect to ethylene consumption was about 118 kg mol$^{-1}$ h$^{-1}$.

Polymer Characterization: RI GPC Analysis (o-dichlorobenzene, about 135° C.): $M_w$=about 6.57×10$^4$, $M_w/M_n$=about 1.4. DSC Analysis: $T_m$=broad glass transition. $^1$H NMR (C$_6$D$_6$/1,2,4-trichlorobenzene, about 115° C.): 31.4 methyl branches per 1000 methylene carbons. About 12.5% incorporation of norbornenyl group.

EXAMPLE 17

Figure 10:
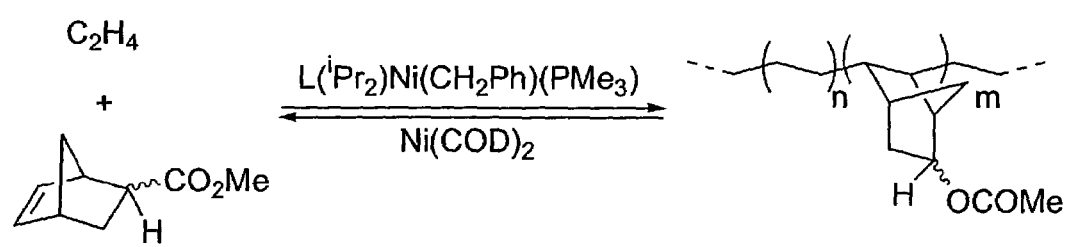
FIG. 10 is a schematic of the synthesis of a high molecular weight ester-functionalized polyethyelene polymer, using 5-norbornen-2-yl acetate as a co-monomer.

A glass reactor was loaded inside a glove box with L($^i$Pr$_2$)Ni($\eta^1$-CH$_2$Ph)(PMe$_3$) (about 20 μmol; 2.00 g of 8.77 mM solution in toluene), Ni(COD)$_2$ (about 50 μmol; 2.50 g of 17.6 mM solution in toluene), 5-norbornen-2-yl acetate (about 4.50 mmol; 3.00 g of 1.30 M solution in toluene) and toluene (about 18.45 g) such that the total volume of the toluene solution was about 30 mL. FIG. 10 shows the synthesis. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 160 minutes and acetone was added to quench the polymerization. The precipitated polymer was collected by filtration and dried under high vacuum overnight. About 2.298 g of ethylene/5-norbornen-2-yl acetate co-polymer was obtained. The activity of the catalyst with respect to ethylene consumption was about 23 kg mol$^{-1}$ h$^{-1}$.

Figure 8:
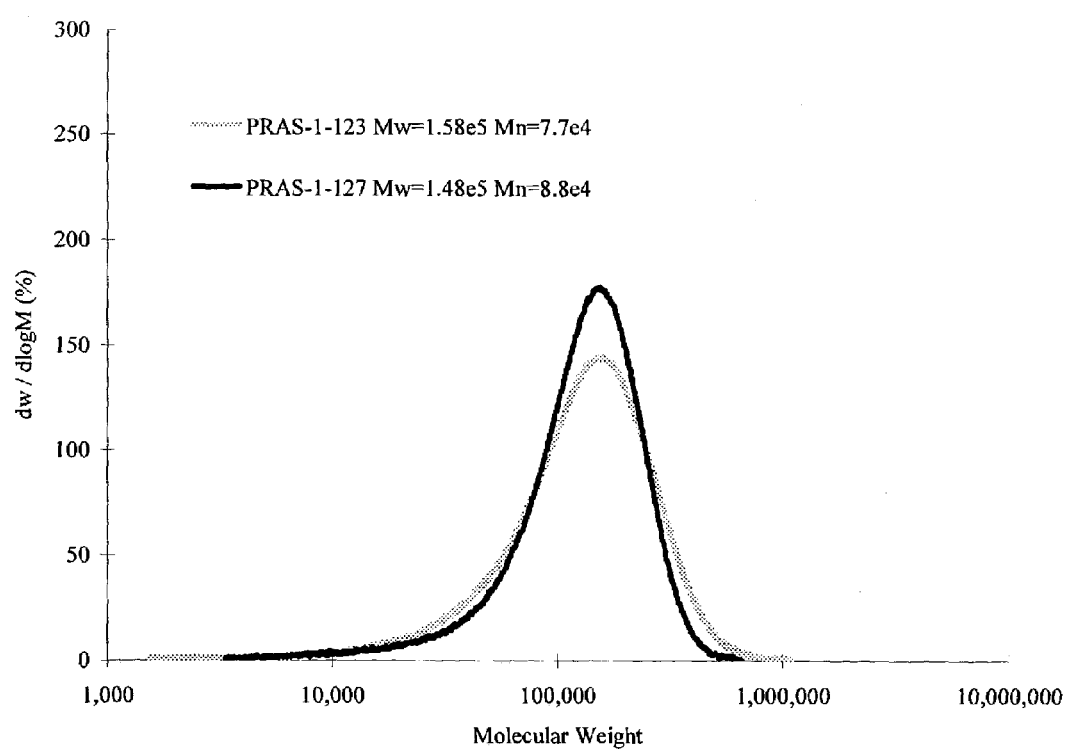
FIG. 8 is a graphical representation of an embodiment of the present invention showing the molecular weight distributions of ethylene/5-norbornen-2-yl acetate co-polymers of Examples 17 and 18.

Polymer Characterization: GPC Analysis (o-dichlorobenzene, about 135° C.): $M_w$=about 1.58×10$^5$, $M_w/M_n$=about 2.1. DSC Analysis: $T_m$=about 98.7° C. (broad peak). $^1$H NMR (C$_6$D$_6$/1,2,4-trichlorobenzene, about 115° C.): 14.4 methyl branches per 1000 methylene carbons. About 6.2% incorporation of norbornenyl group. A molecular weight distribution graph of ethylene/5-norbornen-2-yl acetate co-polymers is shown in FIG. 8. A uni-modal distribution is observed in all cases.

EXAMPLE 18

A glass reactor was loaded inside a glove box with L($^i$Pr$_2$)Ni($\eta^1$-CH$_2$Ph)(PMe$_3$) (about 20 μmol; 2.00 g of 8.77 mM solution in toluene), Ni(COD)$_2$ (about 50 μmol; 2.50 g of 17.6 mM solution in toluene), 5-norbornen-2-yl acetate (about 4.50 mmol; 3.00 g of 1.30 M solution in toluene) and toluene (about 18.45 g) such that the total volume of the toluene solution was about 30 mL. The glass reactor was sealed inside the glove box and was attached to a vacuum/ nitrogen line manifold. Ethylene was fed continuously into the reactor at about 100 psi and the pressurized reaction mixture was stirred at about 20° C. Ethylene was vented after about 130 minutes and acetone was added to quench the polymerization. The precipitated polymer was collected by filtration and dried under high vacuum overnight. About 1.027 g of ethylene/5-norbornen-2-yl acetate co-polymer was obtained. The activity of the catalyst with respect to ethylene consumption was about 30 kg mol$^{-1}$ h$^{-1}$.

Polymer Characterization: GPC Analysis (o-dichlorobenzene, about 135° C.): $M_w$=about 1.48×10$^5$, $M_w/M_n$=about 1.7. DSC Analysis: $T_m$=broad glass transition. $^1$H NMR (C$_6$D$_6$/1,2,4-trichlorobenzene, about 115° C.): 10.6 methyl branches per 1000 methylene carbons. About 12.6% incorporation of norbornenyl group. Molecular weight distribution of the ethylene/5-norbornen-2-yl acetate co-polymer is shown in FIG. 8.

EXAMPLE 19

A glass reactor was loaded inside a glove box with L($^i$Pr$_2$)Ni($\eta^1$-CH$_2$Ph)(PMe$_3$) (about 20 μmol; 2.00 g of 8.77 mM solution in toluene), Ni(COD)$_2$ (about 50 μmol; 2.50 g of 17.6 mM solution in toluene), 5-norbornen-2-yl acetate (about 4.49 mmol; 3.00 g of 1.30 M solution in toluene) and toluene (about 18.45 g) such that the total volume of the toluene solution was about 30 mL. The glass reactor was sealed inside the glove box and was attached to a vacuum/ nitrogen line manifold. Ethylene was fed continuously into the reactor at about 100 psi and the pressurized reaction mixture was stirred at about 20° C. Ethylene was vented after about 120 minutes and acetone was added to quench the polymerization. The precipitated polymer was collected by filtration and dried under high vacuum overnight. About 1.548 g of ethylene/5-norbornen-2-yl acetate co-polymer was obtained. The activity of the catalyst with respect to ethylene consumption was about 30 kg mol$^{-1}$ h$^{-1}$.

Polymer Characterization: GPC Analysis (o-dichlorobenzene, about 135° C.): $M_w$=about 1.59×10$^5$, $M_w/M_n$=about 1.7. DSC Analysis: $T_m$=about 90.8° C. $^1$H NMR (C$_6$D$_6$/1,2,4-trichlorobenzene, about 115° C.): 16.5 methyl branches per 1000 methylene carbons. About 9.2% incorporation of norbornenyl group.

EXAMPLE 20

A glass reactor was loaded inside a glove box with L($^i$Pr$_2$)Ni($\eta^1$-CH$_2$Ph)(PMe$_3$) (about 20 μmol; 2.00 g of 8.77 mM solution in toluene), Ni(COD)$_2$ (about 50 μmol; 2.50 g of 17.6 mM solution in toluene), 5-norbornen-2-yl acetate (about 4.49 mmol; 3.00 g of 1.29 M solution in toluene) and toluene (about 18.45 g) such that the total volume of the solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 116 minutes and acetone was added to quench the polymerization. The precipitated polymer was collected by filtration and dried under high vacuum overnight. About 2.070 g of ethylene/5-norbornen-2-yl acetate co-polymer was obtained. The activity of the catalyst with respect to ethylene consumption was about 41 kg mol$^{-1}$ h$^{-1}$.

Polymer Characterization: RI GPC Analysis (o-dichlorobenzene, about 135° C.): $M_w$=about $1.81 \times 10^5$, $M_w/M_n$=about 1.8. DSC Analysis: $T_m$=about 100.7° C. $^1$H NMR ($C_6D_6$/1,2,4-trichlorobenzene, about 115° C.): 15.4 methyl branches per 1000 methylene carbons. About 8.1% incorporation of norbornenyl group.

EXAMPLE 21

A glass reactor was loaded inside a glove box with L($^i$Pr$_2$)Ni($\eta^1$-CH$_2$Ph)(PMe$_3$) (about 20 µmol; 2.00 g of 8.77 mM solution in toluene), Ni(COD)$_2$ (about 50 µmol; 2.50 g of 17.6 mM solution in toluene), 5-norbornen-2-yl acetate (about 1.79 mmol; 3.00 g of 0.517 M solution in toluene) and toluene (about 18.45 g) such that the total volume of the solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 60 minutes and acetone was added to quench the polymerization. The precipitated polymer was collected by filtration and dried under high vacuum overnight. About 2.373 g of ethylene/5-norbornen-2-yl acetate co-polymer was obtained. The activity of the catalyst with respect to ethylene consumption was about 70 kg mol$^{-1}$ h$^{-1}$.

Polymer Characterization: RI GPC Analysis (o-dichlorobenzene, about 135° C.): $M_w$=about $1.66 \times 10^5$, $M_w/M_n$=about 1.7. DSC Analysis: $T_m$=about 108.7° C. $^1$H NMR ($C_6D_6$/1,2,4-trichlorobenzene, about 115° C.): 13.3 methyl branches per 1000 methylene carbons. About 3.7% incorporation of norbornenyl group.

EXAMPLE 22

Figure 12:
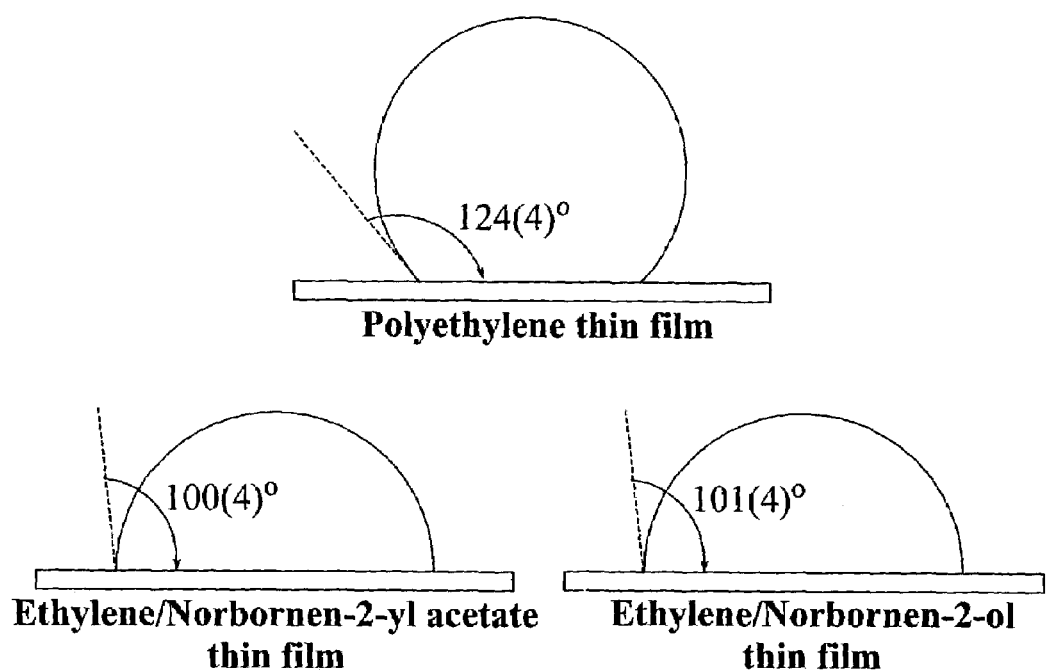
FIG. 12a-c are contact angle measurements of water droplets on different polymer films: polyethylene film (FIG. 12a); ethylene/5-norbornen-2-acetate film (FIG. 12b); and ethylene/5-norbornen-2-ol film (FIG. 12c) of Example 22.

The effect of functionality incorporation on the hydrophobicity of films made with the new copolymers was probed by contact angle measurements, see FIGS. 12a-c. Specifically, thin films of the ethylene/5-norbornen-2-yl acetate co-polymer (FIG. 12b), the ethylene/5-norbornen-2-ol co-polymer (FIG. 12c) and the polyethylene polymer (FIG. 12a) were prepared on glass slides and the contact angle measurements of water droplets on these thin films were done. The increased hydrophilic nature of the ethylene/5-norbornen-2-yl acetate co-polymer and the ethylene/5-norbornen-2-ol co-polymer, relative to polyethylene, was noted on the respective contact angles. The average advancing contact angles for the ethylene/5-norbornen-2-yl acetate co-polymer [about 100(4)°] and the ethylene/5-norbornen-2-ol co-polymer [about 101(4)°] were significantly lower (by about 25°) than that of the polyethylene [about 124(4) °].

EXAMPLE 23

Detailed concentration dependence studies were performed for ethylene co-polymerization with finctional monomers. Table 4 summarizes results obtained for ethylene co-polymerization with 5-norbornen-2-ol while Table 5 summarizes ethylene co-polymerization with 5-norbornen-2-yl acetate.

TABLE 1

| Norbornenyl alcohol (M) | $M_w$ | $M_n$ | $M_w/M_n$ | Incorp. (%) | Branching (%) |
|---|---|---|---|---|---|
| 0.03 | $2.09 \times 10^4$ | $1.10 \times 10^4$ | 1.9 | 5 | 3 |
| 0.07 | $8.68 \times 10^4$ | $2.20 \times 10^4$ | 3.9 | 14 | 2 |
| 0.13 | $6.57 \times 10^4$ | $4.70 \times 10^4$ | 1.4 | 13 | 3 |
| 0.15 | $3.75 \times 10^4$ | $3.00 \times 10^4$ | 1.3 | 16 | 1 |
| 0.15 | $5.47 \times 10^4$ | $4.30 \times 10^4$ | 1.3 | 16 | 1 |
| 0.30 | $1.38 \times 10^4$ | $4.70 \times 10^3$ | 2.9 | 19 | 5 |

Table 1 shows ethylene/5-norbornen-2-ol co-polymerization by L($^i$Pr$_2$)Ni(CH$_2$Ph)(PMe$_3$) and Ni(COD)$_2$ complexes as a fuinction of 5-norbornen-2-ol concentration at about 0.68 mM Ni catalyst concentration, about 1.70 mM Ni(COD)$_2$ concentration, about 100 psi ethylene pressure, about 20° C. temperature and about 20 minutes reaction time.

TABLE 2

| Norbornenyl acetate (M) | $M_w$ | $M_n$ | $M_w/M_n$ | Incorp. (%) | Branching (%) |
|---|---|---|---|---|---|
| 0.06 | $1.66 \times 10^5$ | $9.40 \times 10^4$ | 1.7 | 4 | 1 |
| 0.10 | $1.53 \times 10^5$ | $9.50 \times 10^4$ | 1.6 | 4 | 1 |
| 0.15 | $1.08 \times 10^5$ | $8.00 \times 10^4$ | 1.4 | 10 | 3 |

Table 2 shows ethylene/5-norbornen-2-yl acetate co-polymerization by L($^i$Pr$_2$)Ni(CH$_2$Ph)(PMe$_3$) and Ni(COD)$_2$ complexes as a function of 5-norbornen-2-yl acetate concentration at about 0.68 mM Ni catalyst concentration, about 1.70 mM Ni(COD)$_2$ concentration, about 100 psi ethylene pressure, about 20° C. temperature and about 60 minutes reaction time.

REFERENCES

The following references are hereby incorporated by reference: 1. Ittel, S. D., Johnson, L. K., Brookhart, M. Chem. Rev. 2000, 100, 1169 (and references therein); 2. Gates, D. P., Svejda, S., Onate, E., Killian, C. M., Johnson, L. K., White, P. S., Brookhart, M. Macromolecules, 2000, 33, 2320; 3. Svejda, S. A., Johnson, L. K., Brookhart, M. J. Am. Chem. Soc. 1999, 121, 10634; 4. Younkin, T.; Connor, E. F.; Henderson, J. I.; Friedrich, S. K.; Grubbs, R. H.; Bansleben, D. A. Science, 2000, 287, 460; WO 9842664.; WO 9842665; 5. Lee, B. Y.; Bazan, G. C.; Vela, J.; Komon, Z. J. A.; Bu, X. J. Am. Chem. Soc. 2001, 123, 5352; 6. Schunn, R. A.; Ittel, S. D.; Cushing, M. A. Inorg. Synth. 1990, 28, 94; and 7. W. W. Yan et al., "Modem Size—Exclusion Liquid Chromatography" J. Wiley & Sons, N.Y., USA, pages 4-8, 249-283 and 315-340 (1979).

These and other changes and modifications are intended to be included within the scope of the invention. While for the sake of clarity and ease of description, several specific embodiments of the invention have been described; the scope of the invention is intended to be measured by the claims as set forth below. The description is not intended to be exhaustive or to limit the invention to the form disclosed. Other variations of the invention will be apparent in light of the disclosure and practice of the invention to one of ordinary skill in the art to which the invention applies.

What is claimed is:

1. A method for producing a polyolefin, comprising:
   polymerizing or co-polymerizing an olefin in the presence of a catalyst, the catalyst comprising any combination of two neutral metal compounds, the combination having the general formula II, III, or IV:

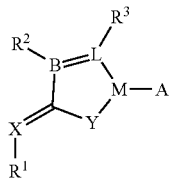 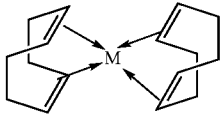 (II)

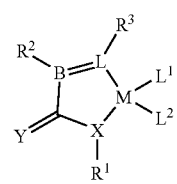 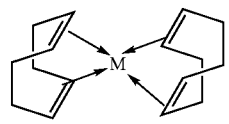 (III)

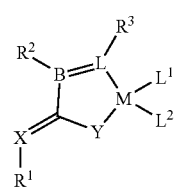 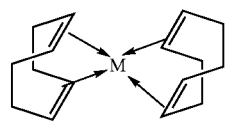 (IV)

wherein:

M is Ni, Pt, Pd;

A is a π-allyl, a substituted π-allyl, a π-benzyl or a substituted π-benzyl;

X is N or P;

Y is O, CH$_2$, or S;

L is N or a structure that is capable of forming a neutral two electron donor ligand;

L$^1$ is a neutral monodentate ligand capable of being displaced by said olefin and L$^2$ is a monoanionic monodentate ligand, or L$^1$ and L$^2$ taken together are a monoanionic bidentate ligand, provided that said monoanionic monodentate ligand or said monoanionic bidentate ligand is capable of adding to said olefin;

B is a bridge connecting covalently an unsaturated carbon and L;

R$^1$, R$^2$, and R$^3$ are the same or different and are each independently hydrogen, hydrocarbyl group, or substituted hydrocarbyl bearing functional group.

2. A method for producing a polyolefin, comprising:
polymerizing or co-polymerizing an olefin in the presence of a catalyst, the catalyst comprising any combination of two neutral metal compounds, the combination having the general formula I, II, III, or IV:

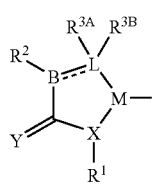 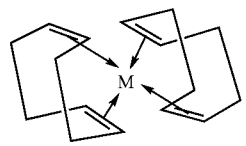 (I)

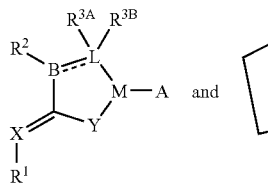 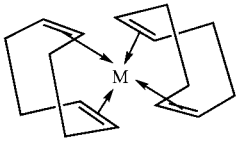 (II)

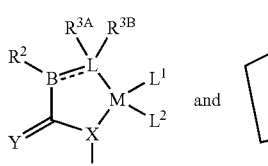 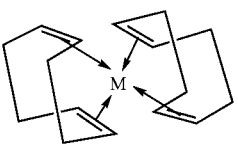 (III)

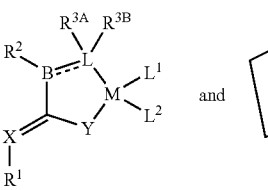 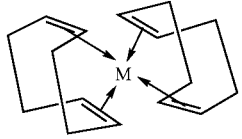 (IV)

wherein:

M is Ni, Pt, Pd;

A is a π-allyl, a substituted π-allyl, a π-benzyl or a substituted π-benzyl;

X is N;

Y is O;

L is N;

L$^1$ is CH$_2$Ph;

L$^2$ is PMe$_3$;

B is carbon;

---- is a double bond;

wherein R$^1$ and R$^{3A}$ are (2,6-diisopropylphenyl); R$^2$ is methyl; and R$^{3B}$ is nothing.

3. A method for producing a polyolefin, comprising:
polymerizing or co-polymerizing an olefin in the presence of a catalyst, the catalyst comprising the combination of two neutral metal compounds, the combination having the general formula:

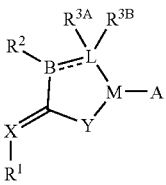 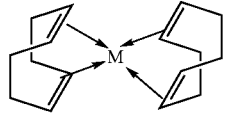

wherein:

M is Ni, Pt, Pd;

A is a π-allyl, a substituted π-allyl, a π-benzyl or a substituted π-benzyl;

X is N or P;

Y is O, CH$_2$, or S;

L is N or P or a structure that is capable of forming a neutral two electron donor ligand;

B is a bridge connecting covalently an unsaturated carbon and L;

---- is a single or double bond;

$R^1$, $R^2$, $R^{3A}$ and $R^{3B}$ are the same or different and are each independently hydrogen, hydrocarbyl group, or substituted hydrocarbyl bearing functional group;

$R^{3B}$ is nothing when B is connected to L by a double bond.

4. The method of claim 3, wherein M is nickel.

5. The method of claim 3, wherein the olefin is selected from the group consisting of a compound of the formula $R^5CH=CH_2$, wherein $R^5$ is hydrogen, a hydrocarbyl group, or a substituted hydrocarbyl bearing functional group; cyclopentene; styrene; norbornene; a polar olefin; substituted cyclopentene; substituted styrene; substituted norbornene derivative having a functional group; and a combination thereof; wherein the polymerization is conducted at a temperature of about −100° C. to about 200° C.

6. The method of claim 5, wherein the polar olefin is $H_2C=CH(CH_2)_sCO_2R^6$ and wherein $R^6$ is hydrogen, hydrocarbyl group, a substituted hydrocarbyl bearing functional group, or a combination thereof; and s is an integer from 0 to 100.

7. A method for producing a polyolefin, comprising:
polymerizing or co-polymerizing an olefin in the presence of a catalyst, the catalyst comprising the combination of two neutral metal compounds, the combination having the general formula:

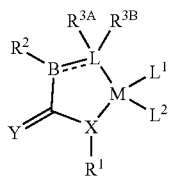 and 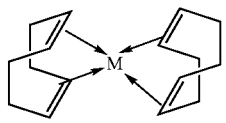

wherein:
M is Ni, Pt, Pd;
X is N or P;
Y is O, $CH_2$, or S;
L is N or P or a structure that is capable of forming a neutral two electron donor ligand;
$L^1$ is a neutral monodentate ligand capable of being displaced by said olefin and $L^2$ is a monoanionic monodentate ligand, or $L^1$ and $L^2$ taken together are a monoanionic bidentate ligand, provided that said monoanionic monodentate ligand or said monoanionic bidentate ligand is capable of adding to said olefin;
B is a bridge connecting covalently an unsaturated carbon and L;
---- is a single or double bond;
$R^1$, $R^2$, $R^{3A}$ and $R^{3B}$ are the same or different and are each independently hydrogen, hydrocarbyl group, or substituted hydrocarbyl bearing functional group;
$R^{3B}$ is nothing when B is connected to L by a double bond.

8. The method of claim 7, wherein M is nickel.

9. The method of claim 7, wherein the olefin is selected from the group consisting of a compound of the formula $R^5CH=CH_2$, wherein $R_5$ is hydrogen, a hydrocarbyl group, or a substituted hydrocarbyl bearing functional group; cyclopentene; styrene; norbornene; a polar olefin; substituted cyclopentene; substituted styrene; substituted norbornene derivative having a functional group; and a combination thereof wherein the polymerization is conducted at a temperature of about −100° C. to about 200° C.

10. The method of claim 9, wherein the polar olefin is $H_2C=CH(CH_2)_sCO_2R^6$ and wherein $R^6$ is hydrogen, hydrocarbyl group, a substituted hydrocarbyl bearing functional group, or a combination thereof, and s is an integer from 0 to 100.

11. A method for producing a polyolefin, comprising:
polymerizing or co-polymerizing an olefin in the presence of a catalyst, the catalyst comprising the combination of two neutral metal compounds, the combination having the general formula:

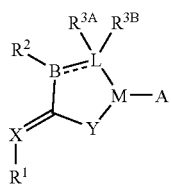 and 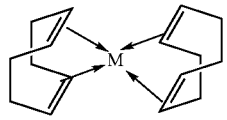

wherein:
M is Ni, Pt, Pd;
X is N or P;
Y is O, $CH_2$, or S;
L is N or P or a structure that is capable of forming a neutral two electron donor ligand;
$L^1$ is a neutral monodentate ligand capable of being displayed by said olefin and $L^2$ is a monoanionic monodentate ligand, or $L^1$ and $L^2$ taken together are a monoanionic bidentate ligand, provided that said monoanionic monodentate ligand or said monoanionic bidentate ligand is capable of adding to said olefin;
B is a bridge connecting covalently an unsaturated carbon and L;
---- is a single or double bond;
$R^1$, $R^2$, $R^{3A}$ and $R^{3B}$ are the same or different and are each independently hydrogen, hydrocarbyl group, or substituted hydrocarbyl bearing functional group;
$R^{3B}$ is nothing when B is connected to L by a double bond.

12. The method of claim 11, wherein M is nickel.

13. The method of claim 11, wherein the olefin is selected from the group consisting of a compound of the formula $R^5CH=CH_2$, wherein $R^5$ is hydrogen, a hydrocarbyl group, or a substituted hydrocarbyl bearing functional group; cyclopentene; styrene; norbornene; a polar olefin; substituted cyclopentene; substituted styrene; substituted norbornene derivative having a functional group; and a combination thereof; wherein the polymerization is conducted at a temperature of about −100° C. to about 200° C.

14. The method of claim 13, wherein the polar olefin is $H_2C=CH(CH_2)_sCO_2R^6$ and wherein $R^6$ is hydrogen, hydrocarbyl group, a substituted hydrocarbyl bearing functional group, or a combination thereof, and s is an integer from 0 to 100.

* * * * *